(Model.)
E. P. PHILLIPS.
Wooden Scoop.
No. 238,308.        Patented March 1, 1881.
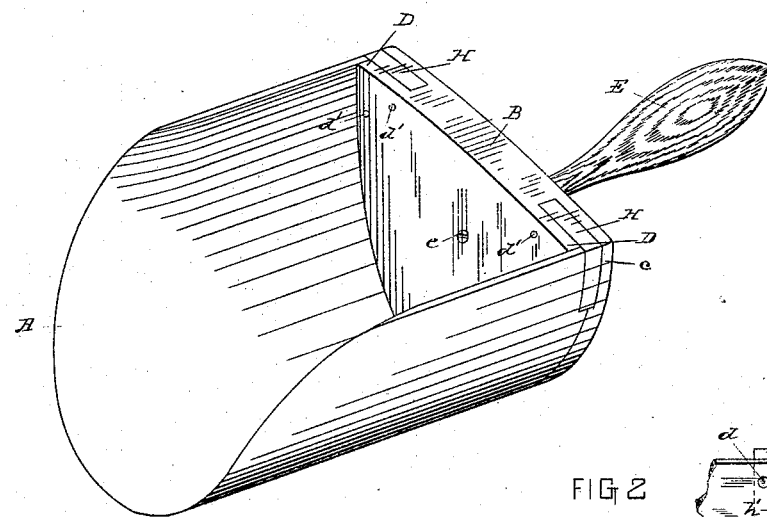
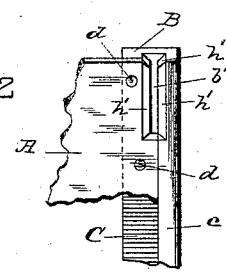
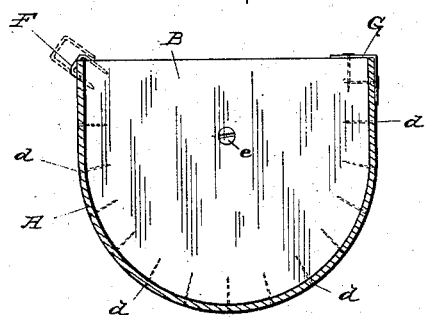
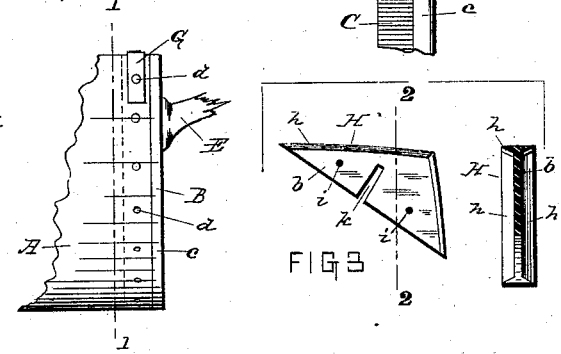
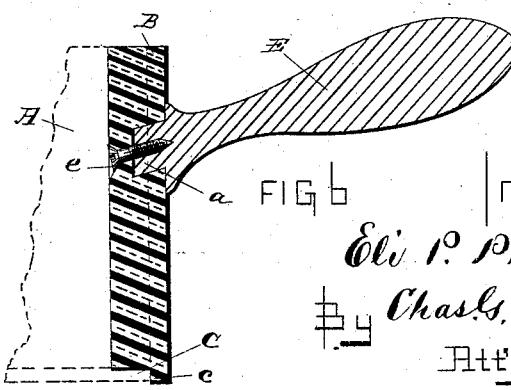
Witnesses
Percy Hughs
E. J. Underwood
Inventor
Eli P. Phillips
By Chas. G. Barnd & Co
Att'ys
N. PETERS, PHOTO-LITHOGRAPHER, WASHINGTON, D. C.

UNITED STATES PATENT OFFICE.

ELI P. PHILLIPS, OF FINDLAY, OHIO.

WOODEN SCOOP.

SPECIFICATION forming part of Letters Patent No. 238,308, dated March 1, 1881.

Application filed October 7, 1880. (Model.)

*To all whom it may concern:*

Be it known that I, ELI P. PHILLIPS, a citizen of the United States, residing at Findlay, in the county of Hancock and State of Ohio, have invented certain new and useful Improvements in Wooden Scoops; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to wooden scoops for flour, sugar, &c.; and it consists of a bowl made of one piece of bent wood, connected with a back board by a rabbet or other similar device fastened by one or more metallic angle-pieces at the corners, and having a wooden handle attached, as hereinafter described.

In the drawings accompanying and forming part of this specification, Figure 1 is a perspective view of the scoop. Figs. 2, 3, 4, and 5 are different views, showing the detail of its construction. Fig. 6 is a sectional view, showing the handle attachment.

A is the bowl, which is made of a single piece of bent wood.

B is the back board, connected with the bowl A by a rabbet, (shown at C.) This back board is attached to the bowl at the corners D D by metallic angle-pieces H H, let into the back board and bowl.

E is the handle, which is constructed with a beveled shoulder and a round tenon, $a$, which tenon enters the back board B through an opening. The handle passes but half-way through the back board, a small hole being made through the uncut portion of the back board, through which a screw, $e$, is inserted in the handle, keeping it securely in place.

In attaching the handle to the back board, glue may be used, if desired, in connection with the screw, so that if the screw becomes loose the glue will retain it in position.

The handle is made to enter the back board at a slight angle, which gives it greater firmness, and also allows it to be grasped by the hand with ease, and at the same time gives the proper inclination to the scoop when in use.

In wooden scoops where the handle is attached to the back board by a screw cut on the end of the handle, the handle works loose, the thread wears out, and the scoop soon becomes worthless. In my invention all this is obviated by the use of a metallic screw passing through the back board and into the handle.

$d\ d$ are tacks or pins attaching the bowl to the back board.

F is a staple or hook, which may be used as a modification of this device, to secure the scoop-board at the corners.

A modification of the staple device is shown at G in Figs. 4 and 5, where a metallic band at the corners is used instead of the staple F.

Referring to Figs. 2 and 3 of the drawings, it will be noticed that the back board has a beveled notch, $b'$, for the reception of the angle-pieces H H, having beveled edges $h$, and may have a slot, $k$, to receive a tongue cut in the back board, so as to more firmly hold the back board and prevent the angle-piece from slipping. The ends of the bowl, where connected with the back board, are also cut away and provided with notches having beveled edges $h'$, for the reception of the flanges of the metallic angle-piece H. The angle-pieces H are provided with small holes $i\ i$, for the passage of the pins or screws $d'$. Now, by this form of construction of the angle-pieces and the ends of the bowl and back board, it will be seen that the inclined or beveled faces of the flanges of the metallic angle-pieces bear against the beveled edges of the bowl and back board and hold them securely in place. The edges of the angle-pieces, being flush with the edges of the bowl and back board, form a continuous surface and offer no obstruction to the material being handled, nor is there danger of their being loosened by abrasion.

Having thus described my invention, what I claim, and desire to secure by Letters Patent, is—

1. In a scoop, the combination, with a bowl having beveled notches at its ends, and a back board, also having its ends slotted and beveled, of two flanged metallic angle-pieces adapted to be inserted in the slotted back board, and resting against and holding the beveled edges of the bowl, substantially as described, and for the purpose set forth.

2. In wooden scoops, the combination of a bowl having recessed beveled notches, a back board having beveled notches at its ends, and a metallic angle-piece adapted to enter and bear against the beveled edges of the bowl and back board, with a handle, E, having a beveled shoulder and round tenon inserted in the back board, substantially as described, and for the purpose set forth.

3. In scoops substantially as described, the combination of a back board having its ends notched and beveled, and a bowl having its ends provided with beveled notches, with a flanged metallic angle-piece, H, adapted to bear against the beveled edges of the bowl and back board and hold the bowl securely in place, substantially as described.

4. In scoops substantially as described, a metallic angle-piece having a central continuous rib, beveled at its ends, and two beveled flanges adapted to fit recesses in the ends of the back board and bowl, whereby the edges of the bowl and back board are held securely in place, substantially as described.

In testimony whereof I affix my signature in presence of two witnesses.

ELI P. PHILLIPS.

Witnesses:
  J. F. BURKET,
  H. F. BURKET.